(12) United States Patent
Tredoux et al.

(10) Patent No.: US 9,860,061 B2
(45) Date of Patent: Jan. 2, 2018

(54) METHODS AND SYSTEMS OF SECURELY STORING DOCUMENTS ON A MOBILE DEVICE

(71) Applicant: Xerox Corporation, Norwalk, CT (US)

(72) Inventors: Gavan Leonard Tredoux, Penfield, NY (US); Kanishk Jain, Jersey City, NJ (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/386,597

(22) Filed: Dec. 21, 2016

(65) Prior Publication Data

US 2017/0103220 A1 Apr. 13, 2017

Related U.S. Application Data

(62) Division of application No. 14/510,222, filed on Oct. 9, 2014.

(51) Int. Cl.
*H04L 9/08* (2006.01)
*G06F 21/62* (2013.01)
*H04L 29/06* (2006.01)

(52) U.S. Cl.
CPC ........ *H04L 9/0869* (2013.01); *G06F 21/6209* (2013.01); *H04L 63/0428* (2013.01); *H04L 2209/24* (2013.01)

(58) Field of Classification Search
None
See application file for complete search history.

(56) References Cited

U.S. PATENT DOCUMENTS

| | | | |
|---|---|---|---|
| 7,243,233 B2 | 7/2007 | Kindberg et al. | |
| 8,792,936 B2 | 7/2014 | Rajendran et al. | |
| 8,842,310 B2 | 9/2014 | Tredoux et al. | |
| 2002/0172363 A1 | 11/2002 | Dierks et al. | |
| 2004/0117651 A1* | 6/2004 | Little ................. | G06F 1/1626 726/27 |
| 2005/0036620 A1* | 2/2005 | Casden ............. | G06F 21/6209 380/259 |
| 2006/0056625 A1 | 3/2006 | Nakabayashi et al. | |
| 2007/0120651 A1* | 5/2007 | Kobayashi ......... | H04B 5/0056 340/10.51 |
| 2008/0258864 A1 | 10/2008 | Hattori et al. | |
| 2009/0044260 A1* | 2/2009 | Niglio ............... | H04L 63/0428 726/9 |
| 2009/0106042 A1 | 4/2009 | Maytal et al. | |
| 2009/0182931 A1* | 7/2009 | Gill .................... | G06F 21/79 711/103 |
| 2009/0292918 A1* | 11/2009 | Mori .................. | G06F 21/31 713/168 |

(Continued)

*Primary Examiner* — Trang Doan
(74) *Attorney, Agent, or Firm* — Fox Rothschild LLP

(57) ABSTRACT

A method of encrypting information using a computational tag may include, by a mobile electronic device, detecting a computational tag within a near field communication range of the mobile electronic device, identifying a document to be encrypted by the mobile electronic device, transmitting the document to the computational tag by the mobile electronic device, receiving, from the computational tag, an encrypted document, wherein the encrypted document comprises an encrypted version of the document that was to be encrypted, and storing the encrypted document in a memory of the mobile electronic device.

14 Claims, 7 Drawing Sheets

(56) References Cited

U.S. PATENT DOCUMENTS

| | | |
|---|---|---|
| 2011/0211690 A1 | 9/2011 | Tu et al. |
| 2011/0305335 A1* | 12/2011 | Negishi ................. H04L 9/0838 380/255 |
| 2012/0300937 A1 | 11/2012 | Burbridge et al. |
| 2013/0208893 A1 | 8/2013 | Shablygin et al. |
| 2013/0268766 A1 | 10/2013 | Schrecker |
| 2014/0226171 A1 | 8/2014 | Tredoux et al. |
| 2014/0292496 A1 | 10/2014 | Tredoux et al. |
| 2014/0293306 A1 | 10/2014 | Tredoux et al. |
| 2014/0298014 A1 | 10/2014 | Kramer et al. |
| 2014/0298035 A1 | 10/2014 | Tredoux et al. |
| 2014/0298434 A1* | 10/2014 | Prchal ................... H04W 4/026 726/7 |
| 2015/0172920 A1 | 6/2015 | Ben Ayed |
| 2016/0014112 A1* | 1/2016 | Gunning ............... H04W 4/008 713/159 |

\* cited by examiner

METHODS AND SYSTEMS OF SECURELY STORING DOCUMENTS ON A MOBILE DEVICE

CROSS-REFERENCE TO RELATED APPLICATIONS

This application claims priority to, and is a divisional application of, U.S. patent application Ser. No. 14/510,222, filed Oct. 9, 2014, the disclosure of which is incorporated by reference herein in its entirety.

BACKGROUND

Encryption is commonly used to control access to electronic data and documents and ensure data privacy. In practice, encryption systems are often difficult and inconvenient to use. As such, they are not as widely deployed as they could be. The proliferation of remote malicious attacks on networked computer systems has also made it difficult to protect and distribute cryptographic keys that are essential to the majority of cryptographic methods.

SUMMARY

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimension recited below. As used herein, the term "comprising" means "including, but not limited to."

In an embodiment, a method of encrypting information using a computational tag may include, by a mobile electronic device, detecting a computational tag within a near field communication range of the mobile electronic device, identifying a document to be encrypted by the mobile electronic device, transmitting the document to the computational tag by the mobile electronic device, receiving, from the computational tag, an encrypted document, wherein the encrypted document comprises an encrypted version of the document that was to be encrypted, and storing the encrypted document in a memory of the mobile electronic device.

In an embodiment, a method of encrypting information using a computational tag may include, by a mobile electronic device, detecting a computational tag within a near field communication range of the mobile electronic device, identifying a document to be encrypted by the mobile electronic device, encrypting the document and generating an unencrypted key that may be used to decrypt the encrypted document by a storage application of the mobile electronic device, transmitting the unencrypted key to the computational tag by the mobile electronic device, receiving by the mobile electronic device from the computational tag, an encrypted key, where the encrypted key includes an encrypted version of the unencrypted key, and storing the encrypted key in a memory of the mobile electronic device and not retaining the unencrypted key in the memory of the mobile electronic device.

In an embodiment, a method of controlling access to a document may include, by a mobile electronic device, receiving a request from a user to access an encrypted document, detecting that a computational tag having decryption capability is in proximity to the mobile electronic device by the mobile electronic device, transmitting an encrypted object to the computational tag, receiving a decrypted version of the encrypted object from the computational tag, and in response to receiving the decrypted version of the encrypted object, presenting a decrypted version of the encrypted object to the user.

In an embodiment, a system of encrypting information using a computational tag may include a mobile electronic device, a computational tag in communication with the mobile electronic device, and a computer-readable storage medium in communication with the mobile electronic device. The computer-readable storage medium may include one or more programming instructions that, when executed, cause the mobile electronic device to detect a computational tag within a near field communication range of the mobile electronic device, identify a document to be encrypted, transmit the document to the computational tag, receive, from the computational tag, an encrypted document, wherein the encrypted document comprises an encrypted version of the document that was to be encrypted, and store the encrypted document in a memory of the mobile electronic device.

DETAILED DESCRIPTION

Figure 1:
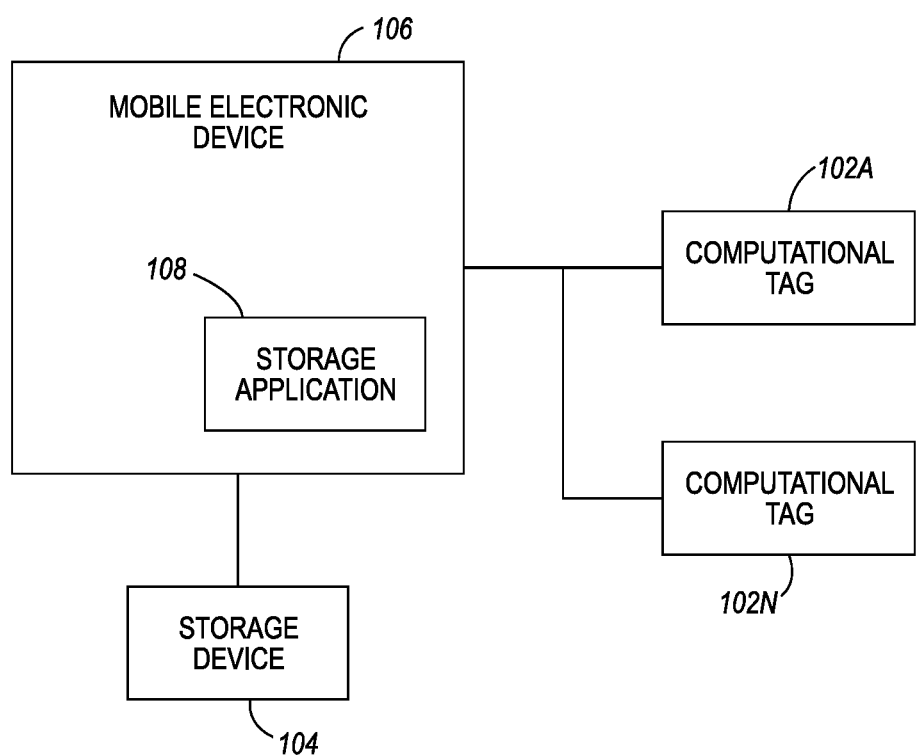
FIG. 1 illustrates an example encryption system according to an embodiment.

For purposes of this document, the following terms shall have the following meanings:

A "computing device" or "electronic device" refers to a device that includes a processor and non-transitory, computer-readable memory. The memory may contain programming instructions that, when executed by the processor, cause the computing device or electronic device to perform one or more operations according to the programming instructions. As used in this description, a "computing device" or an "electronic device" may be a single device, or any number of devices having one or more processors that communicate with each other and share data and/or instructions. Unless the context specifically dictates otherwise, the term "processor" will include embodiments having a single processor, as well as embodiments in which multiple processors collectively perform various steps of a process. Examples of computing devices and/or electronic devices include personal computers, servers, mainframes, gaming systems, televisions, and portable electronic devices such as smartphones, personal digital assistants, cameras, tablet computers, laptop computers, media players and the like.

A "document" refers to electronic data, information or other content. Documents may have one or more formats. For example, a document may be a word processing document, a PDF document, an electronic message, a spreadsheet, an image, a picture, a presentation, a scanned image from a scanner and/or multifunction device and/or the like.

A "tag" refers to an electronic device that includes a non-transitory storage medium that stores a small amount of data (such as a few hundred characters or less), a microchip, and an antenna capable of transmitting and/or receiving data. The antenna typically has a relatively short communication range, such as the ranges that are typical in short range communication protocols and Near Field Communication (NFC) protocols. A tag is typically passive in that it does not have its own power supply, but instead relies on an active device to come into range before it is activated. The passive tag may receive power from the activating device via electromagnetic induction caused by an electromagnetic field that the active device generates. Examples of tags include, without limitation, Near Field Communication (NFC) tags, Bluetooth® tags and the like.

A "computational tag" is a type of tag that has processing capabilities. Unlike a traditional tag, which merely stores data and makes the data available for transmission when activated, a computational tag may perform one or more processing operations on the data. The instructions for the processing operations may be stored in the tag, either in the tag's storage medium or programmed into its microchip.

In this document, the term "randomness value" means a value that is difficult to predict at a certain probability level.

In this document, the term "storage application" means a software application that contains programming instructions that, when executed, manage the access and storage of data on an electronic device. Examples include word processing applications, as well as document management applications such as document readers.

DESCRIPTION

FIG. 1 illustrates an example encryption system according to an embodiment. As illustrated by FIG. 1, an encryption system 100 may include a mobile electronic device 106, one or more computational tags 102a-N, and a data storage device 104. The computational tags 102a-N may be independent tags or affixed to any supporting structure that is carried by a user of the mobile electronic device 106, such as a wallet, watch, key fob, card, or other supporting structure. The computational tags 102a-N will be capable of performing one or more computations when powered by a proximate paired electronic device, such as the mobile electronic device.

In various embodiments, a computational tag 102a-N may be a symmetric tag, in that it may contain programming that, when executed by the tag's microchip processor, can both encrypt and decrypt data such as, for example, data contained in one or more documents. In other embodiments, a computational tag 102a-N may be an asymmetric that may be used to either encrypt or decrypt data, but not both. An asymmetric computational tag 102a-N cannot be used to decrypt data it has encrypted, nor can it be used to encrypt data it has decrypted. A computational tag 102a-N may use one or more known encryption and/or decryption algorithms to encrypt and/or decrypt data. Example encryption and/or decryption algorithms may include, without limitation, RSA, Advanced Encryption Standard, Data Encryption Standard, RC4 and/or any now or hereafter known encryption algorithm or protocol.

In certain embodiments, a computational tag 102a-N may be in communication with the mobile electronic device 106. A computational tag 102a-N may communicate with the mobile electronic device 106 when the computational tag is within a certain range of the mobile electronic device. The range will be a distance that is consistent with a range of the tag's communication components, such as a few inches or a few feet. For example, a computational tag 102a-N may communicate with the mobile electronic device 106 when the computational tag and mobile device come into physical contact with one another, or when the computational tag is a certain distance away from the mobile electronic device.

Storage device 104 is a computer-readable storage medium in communication with the mobile electronic device 106. In one embodiment, the storage device 104 may be networked storage that the electronic device may access via a communication network. In certain embodiments, the storage device 104 may be integrated into or directly connected to the mobile electronic device 106. The mobile electronic device 106 will be programmed with a storage application 108. A storage application 108 is a software application that is used to manage the storage of data on a mobile electronic device 106. A storage application 108 may be in communication with the storage device 104.

In certain embodiments, a system user may use a mobile electronic device to access documents, files or other types of data. For example, an employee may use a mobile electronic device to access and store digital documents while the employee is out of the office. However, due to the potentially sensitive nature of the data that may be accessed remotely, it is important that the data be stored in a secure manner.

According to various embodiments, a system user may have a computational tag. The user may carry the computational tag with them, such as for example, in the user's wallet, on a key fob, or on or in any supporting structure. The user may use the computational tag to encrypt and/or decrypt data, such as documents that the user needs to access while away from the secure network. Using a computational tag to encrypt data provides a user a convenient way to securely store digital data that is received on the user's mobile device.

Figure 2:
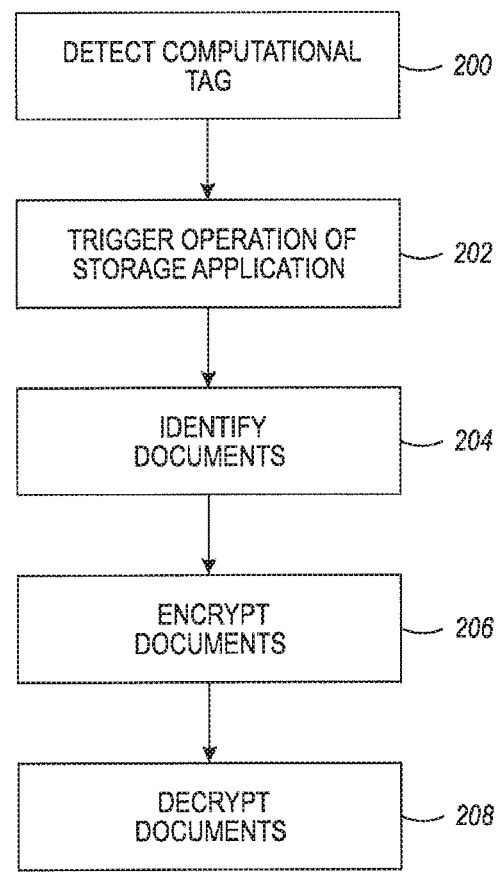
FIG. 2 illustrates a flow chart of an example method of encrypting a document using a computational tag according to an embodiment.

FIG. 2 illustrates a flow chart of an example method of encrypting a document using a computational tag according to an embodiment. As illustrated by FIG. 2, a mobile electronic device may detect 200 the presence of a computational tag. In an embodiment, a mobile electronic device may detect 200 the presence of a computational tag when the computational tag is brought within a certain proximity of the mobile electronic device, and in particular a communication range of the computational tag. In another embodiment, a mobile electronic device may detect 200 the presence of a computational tag when the computational tag is brought into physical contact with at least a portion of the mobile electronic device. For example, a user may touch a computational tag against a mobile electronic device.

In response to detecting 200 a computational tag, operation of a storage application on the mobile electronic device may be automatically triggered 202. In certain embodiments, the storage application may identify 204 one or more documents to be encrypted. The storage application may identify 204 the documents by receiving one or more selections from a user of the mobile electronic device. For instance, when operation of a storage application is triggered 202, the mobile electronic device may display a list of the documents that are available to be encrypted to a user. The list may include a list of at least a portion of documents that are stored in a storage device of the mobile electronic device. The user may select what document is to be encrypted, and the storage application may receive the user's selection.

In various embodiments, a document may be encrypted 206. A document may be encrypted 206 in one of at least two ways. In one way, the document may be transmitted to the computational tag by the short range communication link for encryption by the tag. The tag may then return the encrypted document to the mobile electronic device (or to a different mobile electronic device) for further use by the device's storage application. Alternatively, the encryption operations may be shared between the storage application and the tag. For example, the storage application may generate a key for encrypting the document, encrypt the document, and pass the key along to the tag. The tag may then encrypt the key and return the encrypted key to the mobile device. The mobile device may then store the encrypted document and encrypted key (but not the unencrypted key), as will be discussed in more detail in the embodiment of FIG. 4 below.

Figure 3:
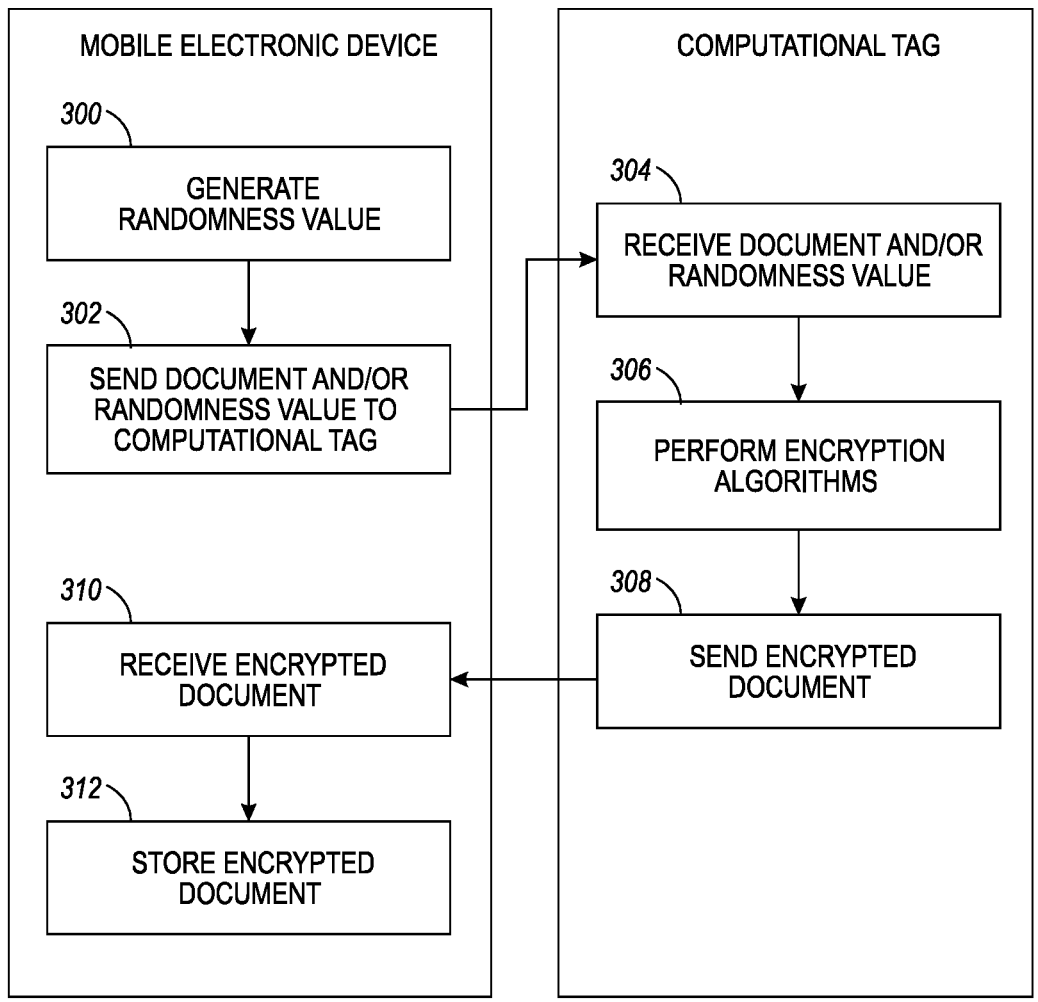
FIGS. 3 and 4 illustrate example methods of encrypting a document according to an embodiment.

FIG. 3 illustrates an example first method of encrypting a document according to an embodiment. As illustrated by FIG. 3, a mobile device may generate 300 a randomness value which may be incorporated into an encryption algorithm. A mobile device may request that a user make one or more movements with the mobile electronic device in order to generate 300 a randomness value. For example, a mobile device may, through a GUI or other interface, ask a user to make one or more arbitrary movements with the mobile electronic device, such as, for example, changing the location or position of the mobile electronic device, shaking the mobile electronic device and/or the like. One or more sensors of the mobile device, such as, for example, an accelerometer, a compass and/or the like, may measure, monitor and/or record the pattern of movement. The mobile electronic device may use the pattern of movement to generate 300 a randomness value.

In another embodiment, a mobile electronic device may generate 300 a randomness value by measuring, monitoring and/or recording measurement fluctuations or patterns of movement over a certain time period, and using those fluctuations or patterns of movement to generate 300 a randomness value. For example, a mobile electronic device may use historical WiFi or accelerometer fluctuations to generate 300 a randomness value. Additional and/or alternate fluctuations or patterns of movement may be used within the scope of this disclosure.

The mobile electronic device may send 302 the document that is to be encrypted and/or the generated randomness value to the computational tag. The computational tag may receive 304 the sent document and/or the randomness value, and may perform 306 one or more encryption algorithms on the received document. In an embodiment, the computational tag may incorporate the received randomness value into the one or more encryption algorithms that are performed 306 on the received data. The received randomness value may only be one element of the encryption algorithm. The particular algorithm that is used may include other random or pseudo-random components to perform the encryption.

The computational tag may send 308 the encrypted document back to the mobile electronic device, and the mobile electronic device may receive 310 the encrypted document. The mobile device may store 312 the received encrypted document. In an embodiment, the mobile device may store 312 the received encrypted document in the mobile electronic device's storage device. In other embodiments, the mobile electronic device may store 312 the received encrypted document in another storage medium.

Figure 4:
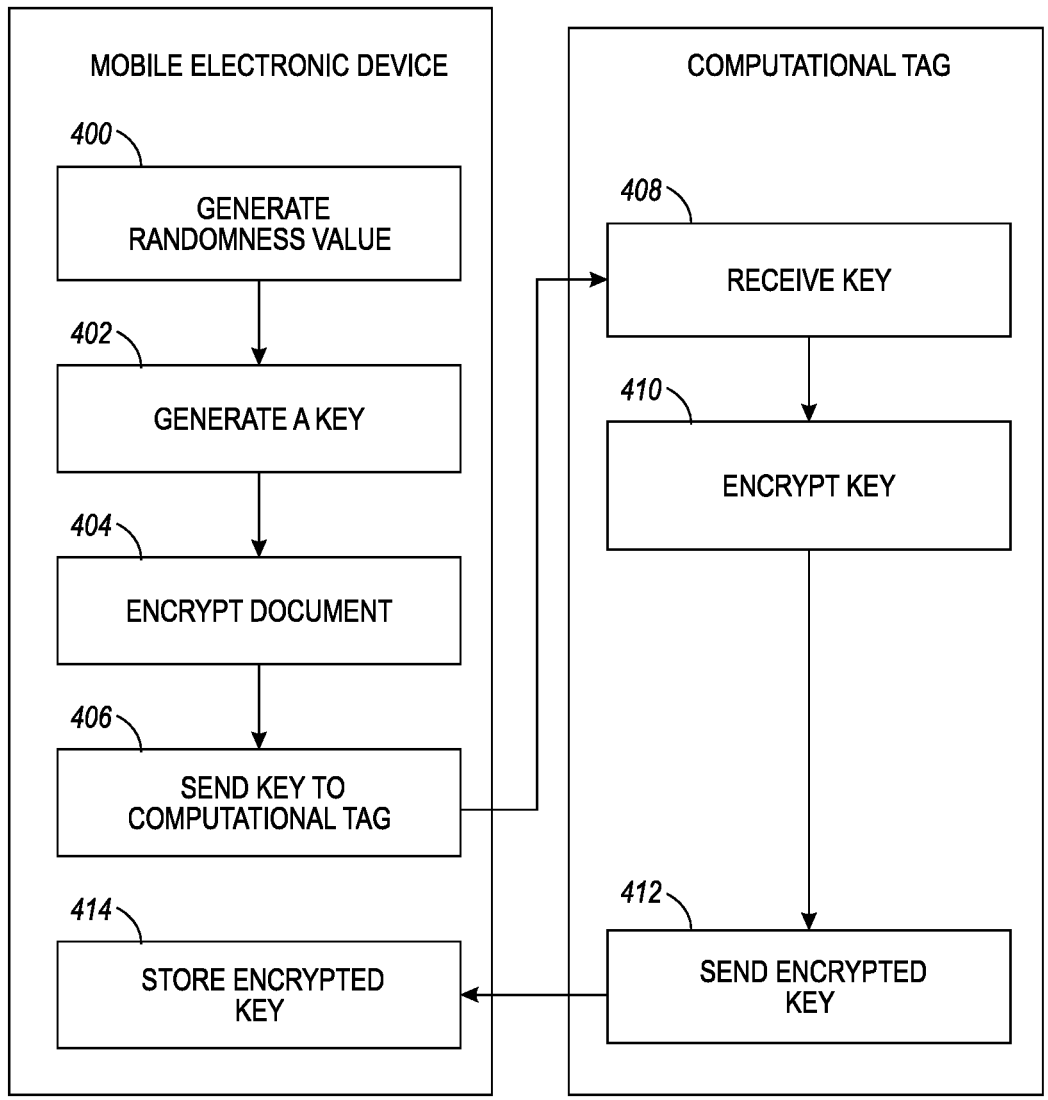

FIG. 4 illustrates an example alternate method of encrypting 206 a document according to an embodiment. As illustrated by FIG. 4, a mobile electronic device may generate 400 a randomness value. The mobile electronic device may generate 400 a randomness value in a manner similar to that described above. In an embodiment, the mobile electronic device may generate 402 a key. The mobile device may generate 402 a key that incorporates the generated randomness value. The received randomness value may only be one element of the key generation. The particular algorithm that is used may include other random or pseudo-random components to generate the key.

The mobile electronic device may encrypt 404 the document using the generated key to produce an encrypted document. The mobile electronic device may send 406 the key to the detected computational tag. The mobile electronic may not store the unencrypted key, and may discard the unencrypted key after it is sent to the computational tag.

The computational tag may receive 408 the key from the mobile electronic device, and may encrypt 410 the received key. The mobile electronic device may then send 412 the encrypted key to the mobile electronic device. The mobile electronic device may store 414 the encrypted key. In certain embodiments, the mobile electronic device may store 414 the encrypted key with the encrypted data. A party that is able to decrypt the key can use it to decrypt the encrypted data.

The tag (or another tag) may then be used to control access to the encrypted document. For example, when the mobile electronic device receives a request to access the encrypted document, the device may determine whether the request is accompanied by a valid decryption action. A valid decryption action is an action that indicates that the encrypted document, or an encrypted key for the document, may be decrypted so that the request may be satisfied. An example of a valid decryption action may include determining that a computational tag having decryption capability is in a communication range of the mobile electronic device. The computational tag may be the same tag that was used to encrypt the document or its key, or it may be a different tag. If the request includes a valid decryption action, then the device's storage application or the tag may decrypt the encrypted document so that the device can present a decrypted version of the encrypted document to a user of the mobile electronic device. If a decryption action is not detected, then the device will neither decrypt the encrypted document nor present the decrypted version of the encrypted document to the user.

Figure 5:
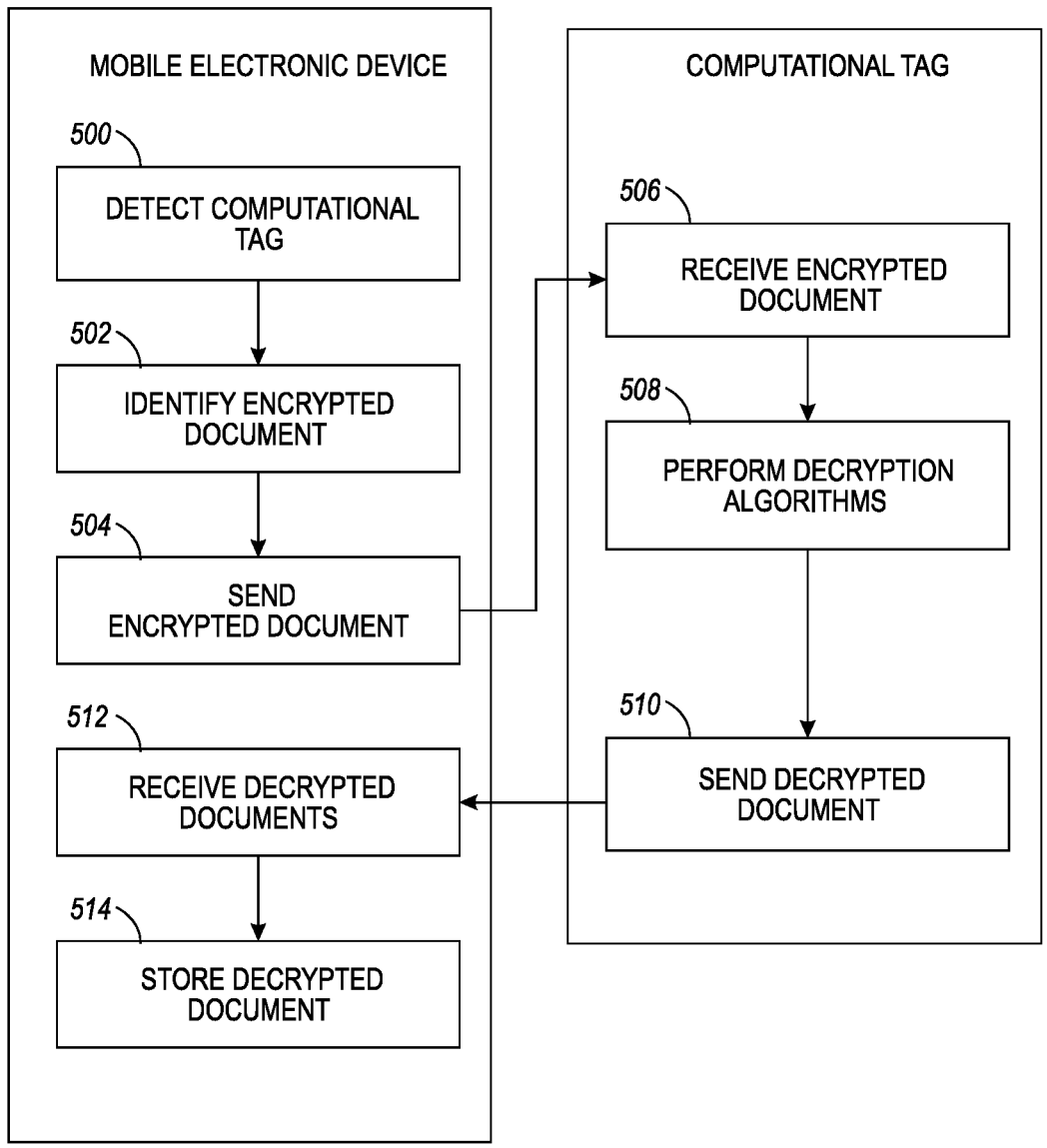
FIGS. 5 and 6 illustrate example methods of decrypting a document according to an embodiment.

On one embodiment the valid decryption action may be detecting that a computational tag having decryption capability is in proximity to the mobile electronic device. The computation tag may be the one that was used to encrypt the document, or it may be a different tag. The electronic device may transmit an encrypted object to the computational tag. The encrypted object may be the encrypted document or the encrypted key. If the encrypted object is the encrypted document, then the computational tag will decrypt the document and return it to the electronic device for presentation to the user. If the encrypted document is an encrypted key, then the computational tag will decrypt the key and return the decrypted key to the device so that the device's storage application may use the decrypted key to decrypt the document This, returning to FIG. 2, an encrypted document may be decrypted 208 using a computational tag. This is further illustrated by FIG. 5, in which a mobile electronic device may detect 500 the presence of a computational tag. In an embodiment, a mobile electronic device may detect 500 the presence of a computational tag when the computational tag is brought within a certain proximity of the mobile electronic device. In another embodiment, a mobile electronic device may detect 500 the presence of a computational tag when the computational tag is brought into physical contact with at least a portion of the mobile electronic device.

The mobile electronic device may identify 502 an encrypted document that is to be decrypted. In an embodiment, the mobile electronic device may identify 502 an encrypted document to be decrypted by receiving a selection of encrypted data. For example, a user may attempt to access or otherwise select an encrypted document using a mobile electronic device. The mobile electronic device may identify 502 the selected encrypted document.

The mobile electronic device may send 504 the identified encrypted document to the detected computational tag. The computational tag may receive 506 the identified encrypted document, and may perform 508 one or more decryption algorithms on the received document. The decryption algorithm or algorithms that are used may correspond to the encryption algorithm or algorithms that were used to encrypt the document.

The computational tag may send 510 the decrypted document back to the mobile electronic device, and the mobile electronic device may receive 512 the decrypted document. The mobile device may store 514 the received decrypted document. In an embodiment, the mobile device may store 514 the received decrypted document in the mobile electronic device's storage device. In other embodiments, the mobile electronic device may store 514 the received decrypted document in another storage medium.

In various embodiments, the mobile electronic device may provide 516 access to the decrypted document to a user of the mobile electronic device. For instance, once the encrypted document has been decrypted, at least a portion of the decrypted document may be displayed on the mobile electronic device.

Figure 6:
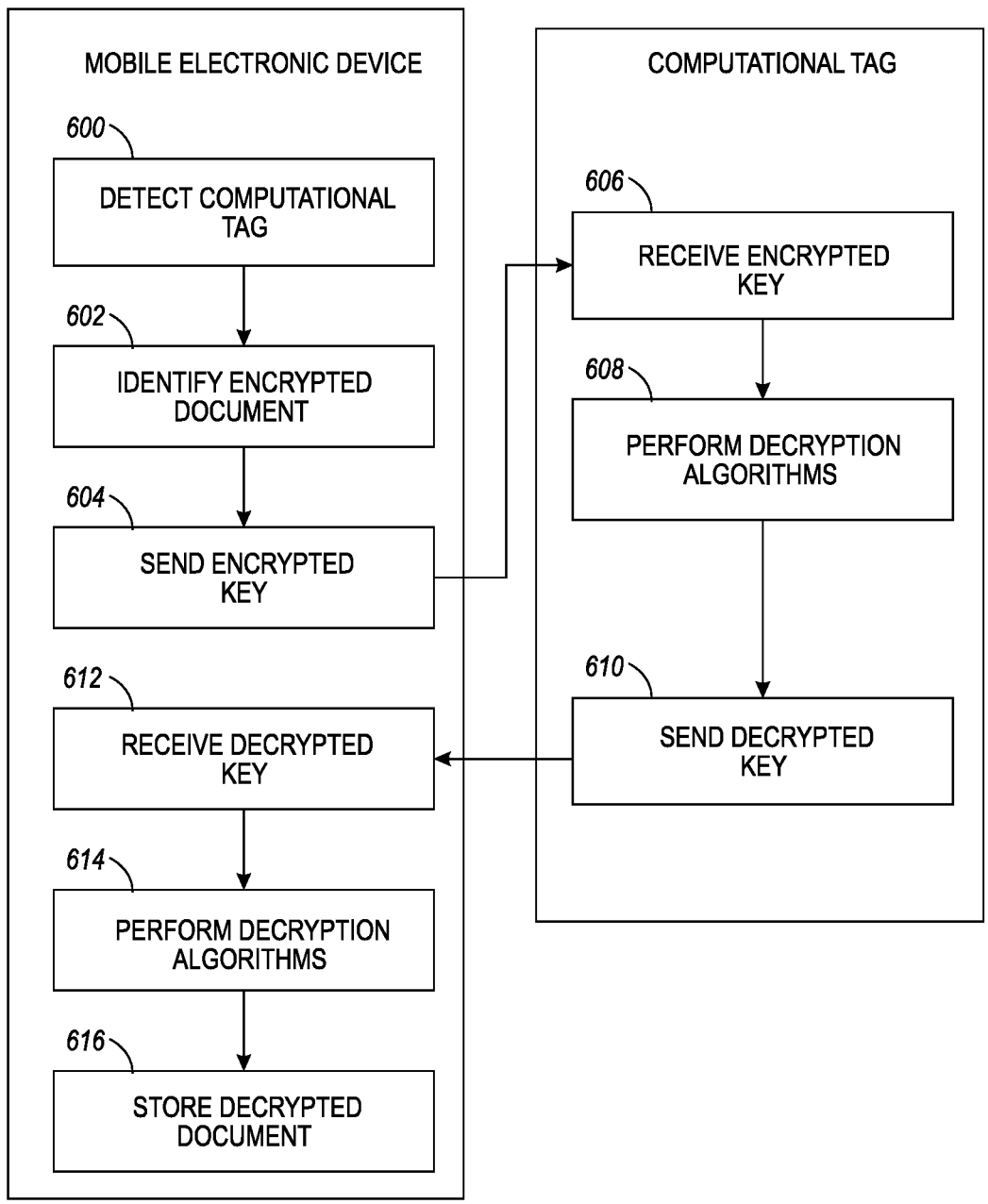

FIG. 6 illustrates an example first method of decrypting a document according to an embodiment. The method illustrated by FIG. 6 may be used to decrypt a document that was encrypted pursuant to the method illustrated by FIG. 4.

As illustrated by FIG. 6, a mobile electronic device may detect 600 the presence of a computational tag. In an embodiment, a mobile electronic device may detect 600 the presence of a computational tag when the computational tag is brought within a certain proximity of the mobile electronic device. In another embodiment, a mobile electronic device may detect 600 the presence of a computational tag when the computational tag is brought into physical contact with at least a portion of the mobile electronic device.

The mobile electronic device may identify 602 an encrypted document that is to be decrypted. In an embodiment, the mobile electronic device may identify 602 an encrypted document to be decrypted by receiving a selection of an encrypted document. For example, a user may attempt to access or otherwise select an encrypted document using a mobile electronic device. The mobile electronic device may identify 602 the selected encrypted document.

In an embodiment, the mobile electronic device may send 604 the encrypted key corresponding to the identified encrypted document to the detected computational tag. The computational tag may receive 606 the encrypted key. The computational tag may perform 608 one or more decryption algorithms on the received data. The decryption algorithm or algorithms that are used may correspond to the encryption algorithm or algorithms that were used to encrypt the key. The computational tag may send 610 the decrypted key to the mobile device. The mobile device may receive 612 the decrypted key, and may use the decrypted key to perform 614 one or more decryption algorithms on the identified encrypted document to generate a decrypted document.

The mobile device may store 616 the decrypted document. In an embodiment, the mobile device may store 616 the decrypted document in the mobile electronic device's storage device. In other embodiments, the mobile electronic device may store 616 the decrypted document in another storage medium.

In various embodiments, the mobile electronic device may provide 618 access to the decrypted document to a user of the mobile electronic device. For instance, once the encrypted document has been decrypted, at least a portion of the decrypted document may be displayed on the mobile electronic device.

Figure 7:
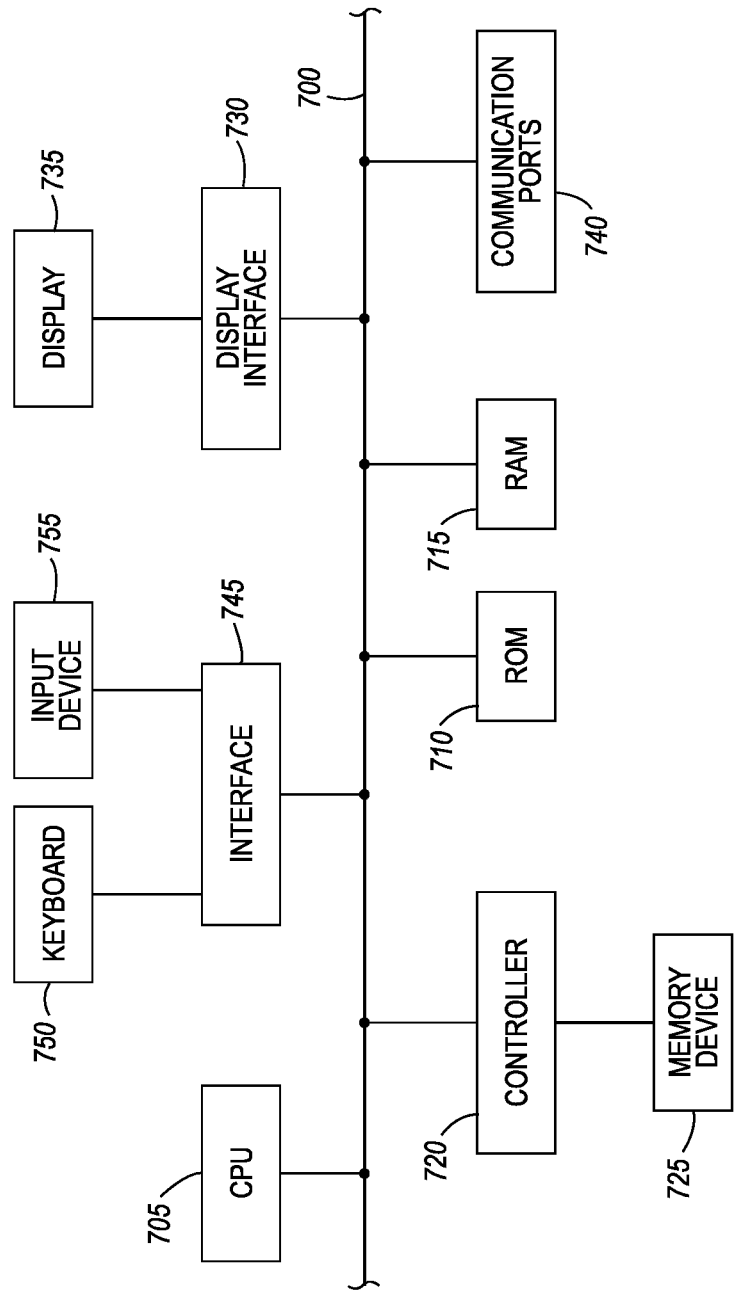
FIG. 7 illustrates a block diagram of example hardware that may be used to contain or implement program instructions according to an embodiment.

FIG. 7 depicts a block diagram of hardware that may be used to contain or implement program instructions. A bus 700 serves as the main information highway interconnecting the other illustrated components of the hardware. CPU 705 is the central processing unit of the system, performing calculations and logic operations required to execute a program. CPU 705, alone or in conjunction with one or more of the other elements disclosed in FIG. 7, is an example of a production device, computing device or processor as such terms are used within this disclosure. Read only memory (ROM) 710 and random access memory (RAM) 715 constitute examples of non-transitory computer-readable storage media.

A controller 720 interfaces with one or more optional non-transitory computer-readable storage media 725 to the system bus 700. These storage media 725 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 710 and/or the RAM 715. Optionally, the program instructions may be stored on a tangible, non-transitory computer-readable medium such as a compact disk, a digital disk, flash memory, a memory card, a USB drive, an optical disc storage medium and/or other recording medium.

An optional display interface 730 may permit information from the bus 700 to be displayed on the display 735 in audio, visual, graphic or alphanumeric format. Communication with external devices, such as a printing device, may occur using various communication ports 740. A communication port 740 may be attached to a communications network, such as the Internet or an intranet.

The hardware may also include an interface 745 which allows for receipt of data from input devices such as a keyboard 750 or other input device 755 such as a mouse, a joystick, a touch screen, a remote control, a pointing device, a video input device and/or an audio input device.

It will be appreciated that the various above-disclosed and other features and functions, or alternatives thereof, may be desirably combined into many other different systems or applications or combinations of systems and applications. Also that various presently unforeseen or unanticipated alternatives, modifications, variations or improvements therein may be subsequently made by those skilled in the art which are also intended to be encompassed by the following claims.

What is claimed is:

1. A method of encrypting information using a computational tag, the method comprising:
   by a mobile electronic device, detecting a computational tag within a near field communication range of the mobile electronic device;
   by the mobile electronic device, identifying a document to be encrypted by:
      in response to detecting the computational tag, causing a storage application on the mobile electronic device to open and one or more stored documents to be displayed, and
      receiving a selection of one of the stored documents;
   by the storage application of the mobile electronic device, encrypting the document and generating an unencrypted key that may be used to decrypt the encrypted document;
   by the mobile electronic device, transmitting the unencrypted key to the computational tag;
   by the mobile electronic device, receiving, from the computational tag, an encrypted key, wherein the encrypted key comprises an encrypted version of the unencrypted key; and
   storing the encrypted key in a memory of the mobile electronic device and not retaining the unencrypted key in the memory of the mobile electronic device.

2. The method of claim 1, wherein detecting the computational tag comprises detecting the computational tag when the tag is in physical contact with the mobile electronic device.

3. The method of claim 1, further comprising:
   by the mobile electronic device, generating a randomness value, and sending the randomness value to the computational tag; and
   by the computational tag, using the randomness value to generate the encrypted key.

4. The method of claim 3, wherein generating a randomness value comprises:
   recording a pattern of fluctuations of the mobile electronic device over a period of time; and
   generating the randomness value using the pattern of fluctuations.

5. The method of claim 4, wherein the pattern of fluctuations comprises a pattern of fluctuations in one or more of the following:
   WiFi connections of the mobile electronic device; and
   fluctuations of measurements by an accelerometer of the mobile electronic device.

6. The method of claim 1, further comprising:
   by the mobile electronic device, receiving a request to access the encrypted document;
   determining whether the request is accompanied by a valid decryption action; and
   if the request includes a valid decryption action, then decrypting the encrypted document and presenting a decrypted version of the encrypted document to a user of the mobile electronic device, otherwise neither decrypting the encrypted document nor presenting the decrypted version of the encrypted document to the user.

7. The method of claim 6, wherein determining whether the request is accompanied by a valid decryption action comprises, by the mobile electronic device:
   detecting that a computational tag having decryption capability is in proximity to the mobile electronic device;
   transmitting an encrypted object to the computational tag, wherein the encrypted object comprises the encrypted document or the encrypted key; and
   receiving a decrypted version of the encrypted object from the computational tag.

8. A system for encrypting information using a computational tag, the system comprising:
   a mobile electronic device; and
   a computer-readable storage medium comprising one or more programming instructions that, when executed, cause the mobile electronic device to:
      detect a computational tag within a near field communication range of the mobile electronic device,
      identify a document to be encrypted by:
         in response to detecting the computational tag, causing a storage application on the mobile electronic device to open and one or more stored documents to be displayed, and
         receiving a selection of one of the stored documents,
      encrypt the document and generating an unencrypted key that may be used to decrypt the encrypted document,
      transmit the unencrypted key to the computational tag,
      receive, from the computational tag, an encrypted key, wherein the encrypted key comprises an encrypted version of the unencrypted key, and
      store the encrypted key in a memory of the mobile electronic device and not retaining the unencrypted key in the memory of the mobile electronic device.

9. The system of claim 8, wherein the one or more programming instructions that, when executed, cause the mobile electronic device to detect the computational tag comprise one or more programming instructions that, when executed, cause the mobile electronic device to detect the computational tag when the tag is in physical contact with the mobile electronic device.

10. The system of claim 8, wherein the computer-readable storage medium further comprises one or more programming instructions that, when executed, cause the mobile electronic device to:
   generate a randomness value, and send the randomness value to the computational tag to use to generate the encrypted key.

11. The system of claim 10, wherein the one or more programming instructions that, when executed, cause the mobile electronic device to generate the randomness value comprise one or more programming instructions that, when executed, cause the mobile electronic device to:
   record a pattern of fluctuations of the mobile electronic device over a period of time; and
   generate the randomness value using the pattern of fluctuations.

12. The system of claim 11, wherein the pattern of fluctuations comprises a pattern of fluctuations in one or more of the following:
   WiFi connections of the mobile electronic device; and
   fluctuations of measurements by an accelerometer of the mobile electronic device.

13. The system of claim 8, wherein the computer-readable storage medium further comprises one or more programming instructions that, when executed, cause the mobile electronic device to:
   receive a request to access the encrypted document;

determine whether the request is accompanied by a valid decryption action; and if the request includes a valid decryption action, decrypt the encrypted document and present a decrypted version of the encrypted document to a user of the mobile electronic device, otherwise neither decrypt the encrypted document nor present the decrypted version of the encrypted document to the user.

14. The system of claim 13, wherein determining whether the one or more programming instructions that, when executed, cause the mobile electronic device to determine whether the request is accompanied by a valid decryption action comprise one or more programming instructions that, when executed, cause the mobile electronic device to:

detect that a computational tag having decryption capability is in proximity to the mobile electronic device;

transmit an encrypted object to the computational tag, wherein the encrypted object comprises the encrypted document or the encrypted key; and receive a decrypted version of the encrypted object from the computational tag.

\* \* \* \* \*